United States Patent [19]
Sugimoto et al.

[11] 4,087,505
[45] May 2, 1978

[54] PROCESS FOR PREPARING TACKY POLYOLEFIN FILM

[75] Inventors: Masaaki Sugimoto; Yoshio Matsumoto; Nobushige Ikeya; Koichi Hasegawa, all of Kurashiki, Japan

[73] Assignee: Mitsubishi Chemical Industries Ltd., Tokyo, Japan

[21] Appl. No.: 718,551

[22] Filed: Aug. 30, 1976

[30] Foreign Application Priority Data

Aug. 28, 1975 Japan .................. 50-104292
Jun. 15, 1976 Japan .................. 51-70205

[51] Int. Cl.² .............................. B29D 7/22
[52] U.S. Cl. .................. 264/95; 260/28.5 A; 260/28.5 B; 260/28.5 C; 260/897 A; 264/211; 264/234; 264/345
[58] Field of Search ............. 264/95, 89, 209, 210 R, 264/211, 234–235, 345–346, 171; 260/897 A, 28.5 A, 28.5 B, 28.5 C

[56] References Cited

U.S. PATENT DOCUMENTS

| | | | |
|---|---|---|---|
| 3,243,396 | 3/1966 | Hammer | 260/897 A |
| 3,278,646 | 10/1966 | Lambert | 260/897 A |
| 3,361,849 | 1/1968 | Cramer et al. | 260/897 A |
| 3,415,925 | 12/1968 | Marans | 264/234 |
| 3,498,962 | 3/1970 | Bruno | 260/897 A |
| 3,536,644 | 10/1970 | Frizelle et al. | 260/28.5 A |
| 3,577,372 | 5/1971 | Flanagan et al. | 260/28.5 A |
| 3,663,488 | 5/1972 | Kail | 260/897 A |
| 3,837,994 | 9/1974 | Flanagan et al. | 260/28.5 B |

*Primary Examiner*—Jeffery R. Thurlow
*Attorney, Agent, or Firm*—Oblon, Fisher, Spivak, McClelland & Maier

[57] ABSTRACT

A tacky polyolefin film is prepared by forming a film using a composition comprising a polyolefin resin, a low grade polyolefin and a tackifier and aging the resulting film.

17 Claims, 1 Drawing Figure

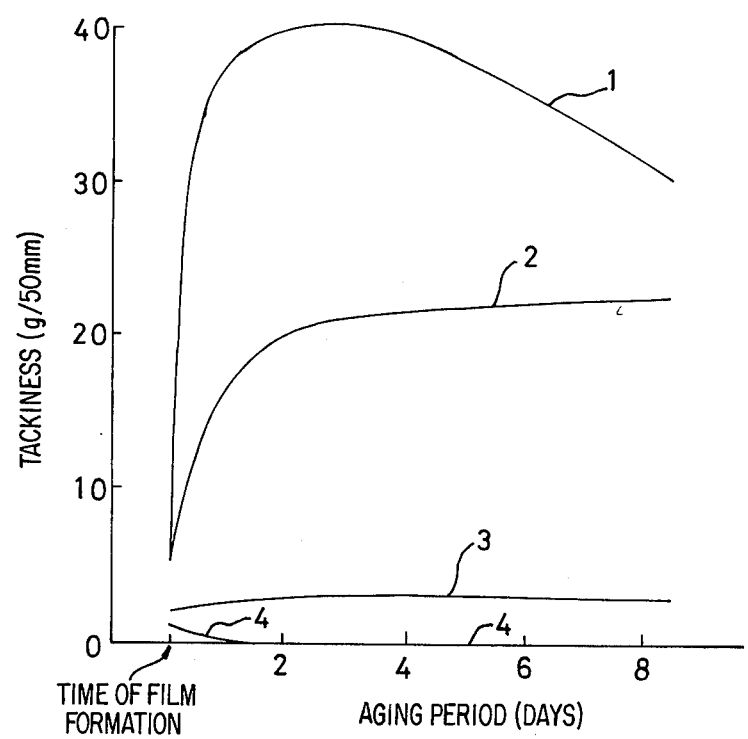

PROCESS FOR PREPARING TACKY POLYOLEFIN FILM

BACKGROUND OF THE INVENTION

1. Field of the Invention

The present invention relates to a process for preparing a tacky polyolefin film by using a composition comprising a polyolefin resin, a low grade polyolefin and a tackifier.

2. Description of the Prior Art

Tacky films have been used as food packaging films such as household wrapping film, business use stretchable film and masking films for decorated plates, steel plates and the like. Such tacky films have been widely used. However, the conventional wrapping films and stretchable films are mainly made of vinyl chloride type resins such as polyvinyl chloride or polyvinylidene chloride as the main component. These chlorine-containing resins are not easily combustible whereby the films are not easily disposed. Moreover, toxic gas is generated in the combustion and the preparation of these films. Recently, these problems have been seriously considered.

Accordingly, the development of tacky films by using a non-chlorine type resin has been attempted. When a polyolefin resin is used, a large amount of a tackifier must be incorporated for imparting a desirable tackiness because the polyolefin resin has no tackiness. However, when a large amount of the tackifier is incorporated, the strength of the resulting film is disadvantageously decreased. Moreover, when a special resin having self-tackiness is used, the cost of the film is disadvantageously high becuase such specific resins are not economical resins which are widely used.

SUMMARY OF THE INVENTION

It is an object of the present invention to provide a tacky polyolefin film which has excellent tackiness and defogging properties; which does not contain a toxic component so that toxic gas is not generated in the combustion or preparation of the film; and which is economical. The object of the present invention has been attained by providing a process for preparing a tacky film having excellent tackiness and strength which comprises incorporating small amounts of low grade polyolefin which is formed as a by-product in the preparation of polyolefin and a tackifier into the main component of the polyolefin and aging the composition thereby achieving a synergistic effect. In other words, the process of the present invention prepares a tacky film by forming a film using a composition comprising a polyolefin resin, a low grade polyolefin and a tackifier and aging the resulting film.

DETAILED DESCRIPTION OF THE PREFERRED EMBODIMENTS

Suitable polyolefin resins for use as the main component of the tacky polyolefin film include commercially available polyethylene, polypropylene, ethylene-propylene copolymer, ethylene-vinyl acetate copolymer, polybutene-1 and mixtures thereof. It is especially preferable to use high pressure process polyethylene (low density polyethylene having a density of 0.91 to 0.93) or ethylene-vinyl acetate copolymer having a vinyl acetate content of less than 20 wt.% and a density of 0.91 to 0.94.

The low grade polyolefins used as one component are usually polyolefins having a number average molecular weight of about 500 to 5000 especially about 1000 to 3000 which can be prepared in any manner. It is preferable to use a low grade polyolefin wax obtained as a by-product in the preparation of polyolefin resins, and it is especially preferable to use a grease wax which is a by-product in the preparation of high pressure process polyethylene or ethylene-vinyl acetate copolymer. The low grade polyolefin can be also obtained by controlling the degree of polymerization by selecting an appropriate polymerization process and conditions for the process for preparing an oligomer. For example, a relatively large amount of a chain transfer agent can be incorporated in an addition polymerization, or a catalyst which controls the degree of polymerization can be used in the process.

Suitable tackifiers for use as the third component of the tacky polyolefin film include terpene resins, coumarone resins, coumarone-indene resins, rosins, xylene resins, petroleum resins and mixtures thereof. The terpene resins are resins having a molecular weight of 600 to 1,300 and a softening point of 10° to 125° C which are obtained by polymerizing a terpene such as turpentine oil, β-pinene, or dipentene using an acid catalyst. The coumarone resins are thermoplastic resins obtained by polymerizing the 170° to 185° C fraction (light oil fraction), produced by distilling coal tar, which mainly contains coumarone, coumarone isomers or a derivative thereof. The coumarone-indene resins are thermoplastic resins having a pale brown to black color and a softening point of 50° to 160° C which comprises a main component of coumarone-indene copolymer which is prepared by polymerizing, using heat as a catalyst, a purified fraction distilled at 160° to 180° C from tar. The rosins are brittle solids having a pale yellow to brown color and a softening point of about 80° C which are residues of the steam distillation of rosin to remove turpentine oil. The xylene resins are resins obtained by reacting m-xylene with formaldehyde.

The petroleum resins are obtained by using petroleum-type unsaturated hydrocarbons as a raw material in a polymerization process, for example, by polymerizing a petroleum fraction having a boiling point of 20° to 380° C with a catalyst comprising sulfuric acid, anhydrous aluminum chloride, borofluoride, etc. It is also possible to use as the petroleum type unsaturated hydrocarbon, a fraction having a boiling point of 150° to 300° C which is formed as a by-product during the cracking or reformation of petroleum. Such fractions comprise mostly aromatic hydrocarbons with small amounts of alicyclic hydrocarbons and aliphatic hydrocarbons. Suitable petroleum-type unsaturated hydrocarbons include aromatic hydrocarbons such as styrene, α-methyl styrene, vinyltoluene, vinylxylene, propenylbenzene, indene, methylindene, ethylindene; and aliphatic or alicyclic hydrocarbons such as butene, pentene, hexene, heptene, octene, butadiene, pentadiene, cyclopentadiene, dicyclopentadiene and the like. One or more unsaturated hydrocarbons may be polymerized. The petroleum resins are usually used after a partial or complete hydrogenation which is carried out by using a conventional catalyst for hydrogenation such as nickel, cobalt, platinum, ruthenium, rhodium, or an oxide thereof. The properties of the petroleum resins are dependent upon the properties of the stock oil, the conditions of polymerization and the degree of hydrogenation. The petroleum resins are thermoplastic resins which have low acid values, low saponification values, high light-fastness, water-resistance and electrical insulation properties and have a softening point of about 60° to 120° C. They are pale yellow to pale brown in color. The petroleum resins are preferably used for the compositions of the invention because the petroleum resins are miscible with natural resins, synthetic resins and plasticizers and the like. It is preferable to incorporate a defogging agent in the composition used for the preparation of the tacky film of the invention. Suitable defogging agents include surfactants such as polyoxyethylene-alkyl ether, polyoxyethylene fatty acid ester, sorbitane fatty acid ester, glycerol fatty acid ester, sodium dialkylsulfosuccinate and mixtures thereof. It is especially preferable to use glycerol fatty acid mono- or di-esters such as glycerol laurate, palmitate, behenate, oleate, linoleate, ricinoleate, stearate, and polyglycerol (glycerine dimer to pentamer) fatty acid esters. From the viewpoints of permanenece and quality of the defogging properties and the like, it is preferable to use polyglycerol fatty acid esters, especially diglycerol fatty acid esters which contain about 50% of monoester and a residue of di- and tri-esters.

The polyolefin composition used in the process of the invention comprises the polyolefin resin, the low grade polyolefin, the tackifier and if necessary, the defogging agent. It is preferable to use the composition comprising 98.5 to 88 wt.% of the polyolefin resin, 0.5 to 6 wt.%, preferably 2 to 4 wt.%, of the low grade polyolefin and 1 to 6 wt.%, preferably 3 to 5 wt.%, of the tackifier. It is further preferable to use the composition comprising 98.45 to 86 wt.% of the polyolefin resin, 0.5 to 6 wt. % of the low grade polyolefin, 1 to 6 wt.% of the tackifier and 0.05 to 2 wt.% of the defogging agent. The amount of the defogging agent is usually less than 2 wt.%, preferably 0.1 to 1 wt.%. When the amounts of the low grade polyolefin or the tackifier are less than that of said range, the synergistic effect is insignificant. When the amount of the low grade polyolefin is more than that of the said range, the melt index of the composition is too high, whereby the tensile strength is too low for the inflation method for forming the film. Moreover, the tubing (the inflated tubing formed by extruding the composition from a die and feeding air into the tubing) laterally swings during the process making it difficult to form a film having uniform thickness. Furthermore, the low grade polyolefin migrates to the surface of the film making it difficult to take up efficiently because of slippage in the winding operation. When the amount of the tackifier is too small, it is difficult to impart the desired tackiness in the preparation of the tacky film. When the amount of the tackifier is too great, it is not economical and it causes stickiness due to excess bleed-out of the tackifier onto the surface of the film. Moreover, it causes a decrease in the film's fabrication properties and the strength of the film. When the same amounts of the low grade polyolefin and the tackifier are used for forming a film having a greater thickness, the amounts of the low grade polyolefin and the tackifier bleeded out onto the surface of the film are increased. Accordingly, for a film of large thickness, the amounts of the low grade polyolefin and the tackifier can be decreased in comparison with those of a film having less thickness. The amounts of the low grade polyolefin and the tackifier are selected depending upon the requirements for the end uses.

The defogging agent acts as a lubricant. Even though an excess of the defogging agent is added, the defogging properties are not improved and this is economically disadvantageous. Moreover, it causes a deterioration of tackiness of the film. In order to improve the clarity of the film and to prevent the fogging of the film after the formation or aging of the film, it is preferable to add the defogging agent in the above-mentioned ratio. The defogging agent migrates to the surface of the film of the low grade polyolefin and the tackifier to result in a long lasting wettable film surface. It is also possible to add an ultraviolet absorber, a thermal stabilizer, a slipping agent or an antiblocking agent to the composition of the polyolefin, the low grade polyolefin and the tackifier, if desired.

The composition used in the process of the invention is prepared by blending the polyolefin resin, the low grade polyolefin and the tackifier and, if necessary, a defogging agent using a desirable apparatus such as a Bumbury's mixer, a continuous mixer, or a blending extruder. The blended composition is used for forming the film. The contents of the tackifier, the low grade polyolefin and the defogging agent need not be set in the aforementioned ranges at first but can be adjusted by the master batch system wherein a master batch of the tackifier, the low grade polyolefin and the defogging agent in high contents is prepared at first and thereafter the contents are adjusted to the aforementioned ranges before forming the film. When the contents in the master batch are too high, the blending before forming the film is sometimes incomplete. In the process of the invention, the composition prepared by blending is used for forming the film by the conventional inflating technique or T-die technique. Then, the tacky film is prepared by aging the resulting film.

In the inflating technique, it is necessary to form the tubing at a blow-up ratio of higher than 4, preferably 5 to 7, especially 6 to 7. The blow-up ratio is the ratio of the circumference of the inflation film (two times the width of the lay-flat film) to the circumference of the orifice of the inflation die, and can be given by $2L/\pi D$ wherein D designates the diameter of the orifice and L designates the width of the lay-flat film. In order to prepare a tubing under such a high blow-up ratio, the polyolefin composition (hereinafter referred to as the composition) is melted and extruded from an extruder as a tubing from the orifice of the inflation die, and air is injected into the tubing to produce the desired blow-up ratio. Thereby, the tubing is blown-up to form an expanded tubing and the tubing is collapsed by a pair of nip rollers to feed it to the next step. The blow-up operation can also be carried out by a two step technique. For example, the tubing can be formed at a blow-up ratio of 2 to 4 and then further expanded to a total blow-up ratio of higher than 4. When the amount of air injected is too small to produce a lower than 4 total blow-up ratio, the tear strength of the tacky polyolefin film in the circumferential direction (transverse direction), that is, the tear resistance parallel to the take-up direction, is not improved resulting in a film which is easily broken in packaging. When the blow-up ratio is increased, it is preferable to equip a tubing stabilizer on the inflating apparatus so as to prevent intermittent slow running and zig-zag running. The thickness of the film is usually less than 100μm, preferably 10 to 50μm. When the film is used as a wrapping film or stretch film, the thickness of the film is preferably 10 to 30μm, especially 15 to 20μm.

In the process of the invention, the tacky film is prepared by aging the film. A synergistic effect of the low grade polyolefin and the tackifier on the tackiness is found at the time of the forming of the film. However, when the film is wound on a core such as a bobbin or a paper tube in close contacting condition at the time of the forming of the film and the wound film is kept for a long time in said condition, the tackiness of the film when it is used after a long time is substantially the same as that of the film at the time of the forming of the film. Accordingly, in order to improve the tackiness, it is necessary to age it at the time of forming of the film. The degree of aging relates to the atmospheric temperature and the aging period. The tackiness increases with higher aging temperature and longer aging period. For example, the film may be kept in an atmosphere at a relatively low temperature for a long period or the film can be exposed to an atmosphere at relatively high temperature for a short period. It is preferable to carry out the aging in an atmosphere at a relatively low temperature in order to maintain the mechanical characteristics of the film at the time of forming of the film. However, when the temperature is too low, it takes a long period of time to impart the desired tackiness whereby it is not suitable for industrial opertion. On the other hand, it is preferable to carry out the aging at relatively high temperature from the viewpoint of productivity. When the temperature is too high, the film is deteriorated in that the molecular orientation disappears and the film is easily broken. When the aging is carried out at a relatively low temperature, the desired tackiness is preferably achieved by controlling the temperature in the atmosphere under a constant aging period. These methods are preferable from the viewpoint of the processability.

As specific embodiments, when the film is formed by the inflating technique, the tubing is taken up on a creel with or without slitting by a slitter into one or more sheets, and the aging is carried out by keeping the film in the form of a hank in a chamber at a desired temperature for a desired period. The aging can be carried out for example at 20° C for from 1 to 4 days; at 40° C for from 5 hours to 2 days; at 60° C for from 15 minutes to 1 day; and at higher temperatures for shorter periods such as at 70° to 90° C for from 10 seconds to 1 hour. However, in the case of creel take-up, it is rare to carry out the aging at higher than 70° C, because it is difficult to uniformly impart tackiness on all parts of the film. In the case of the creel take-up, it is preferable to carry out the aging at 20° to 60° C, especially 35° to 60° C, for 15 minutes to 4 days. In another embodiment, the tubing formed by the inflating technique is continuously fed into an atmosphere at 60° to 150° C, preferably 80° to 120° C, for longer than 5 seconds without winding to perform a heat treatment. It is then passed through the atmosphere before the film melts and then is taken up on a core such as a bobbin or paper tube. In the operation, the aging can be carried out at 100° C for from 10 seconds to 60 seconds. That is, when the tacky film is continuously prepared, the aging can be carried out from 80° to 120° C for from 5 seconds to 120 seconds in an industrial operation.

The atmosphere can be produced by an oven heated by an infrared heater or hot air. The film is passed through the atmosphere. In the process of the invention. It is preferable to carry out the aging for preparing the tack film having a desired tackiness in an atmosphere at 20° to 120° C while controlling the aging period. The low grade polyolefin and the tackifier migrate to the surface of the film by the aging. The effect of the polyolefin composition as the raw material for a tacky film is attained by the synergistic effect of the low grade polyolefin and the tackifier. The tackiness of the film of the polyolefin composition comprising both the low grade polyolefin and the tackifier along with the main component of polyolefin resin is several times, without aging, and several to several tens of times, with aging, that of the compositions containing either the low grade polyolefin or the tackifier. The strength of the film is also satisfactorily high.

Referring to FIG. 1, the tackiness of the tacky polyolefin films obtained by certain examples of the invention will be illustrated. FIG. 1 is a graph showing the relationship of the tackiness and the aging period. The tackiness (g/50 mm, measured by the 180° peeling-off test) is shown on the ordinate and the aging period (days) is shown on the abscissa. In FIG. 1, the reference numerals 1 to 4 designate films of the following compositions and the following temperatures.

| Reference Numeral | Polyethylene | Low Grade Polyethylene | Petroleum Resin | Aging Temp. |
| --- | --- | --- | --- | --- |
| 1 | 95 wt.% | 2 wt.% | 3 wt.% | 40° C |
| 2 | 95 wt.% | 2 wt.% | 3 wt.% | 20° C |
| 3 | 94 wt.% | 6 wt.% | — | 40° C |
| 4 | 95 wt.% | — | 5 wt.% | 40° C |

The films 1 and 2 which comprise the low grade polyethylene and the petroleum resins had tackinesses which are about two times the tackiness of the films 3 and 4 at the time of film formation, and which are about 20 to 40 times the tackiness of the films 3 and 4 after aging whereby the synergistic effects are found. On the other hand, the films of the composition comprising either the low grade polyolefin or the tackifier have tackinesses which are not increased or lost by aging. In order to impart sufficient tackiness to the polyolefin films, it is not enough to incorporate either the low grade polyolefin or the tackifier. When the films prepared by the process of the invention are used as household wrapping film or business use stretchable film, the tackiness of the film is usually 3 to 10 g/50 mm, preferably 4 to 6 g/50 mm. When large amounts of the low grade polyolefin and the tackifier are incorporated to produce the synergistic effect, the cost of the film is high, the film fabricatability is inferior and the melt index is adversely affected, thereby decreasing the strength of the tacky film. When both the low grade polyolefin and the tackifier are incorporated at the ratio stated above into the polyolefin resin, the total content needed can be remarkably decreased because of the synergistic effect on the tackiness. The grease wax which is a by-product in the preparation of the polyolefin resin can be used as the low grade polyolefin whereby the cost can be low. Moreover, no toxic additives are incorporated and the film has desirable clarity. Accordingly, the tacky film can be used as a stretch film for packaging foods. Complicated operations for blending the low grade polyolefin and the tackifier are not required and the decrease in the mechanical strength of the polyolefin resin as the main component can be advantageously decreased.

Having now fully described the invention, a further understanding can be attained by reference to certain specific Examples which are provided herein for purposes of illustration only and are not intended to be limiting in any manner, unless otherwise specified. In the Examples, the samples of the tacky polyolefin films and the test methods of measuring the physical properties are as follows:
Samples:
Aging period:

AT FORMING

The time at which the film was just formed.

1 DAY

The film is loosely wound on a creel and is kept at the temperature for 1 day and then it is tightly wound on a paper tube and is kept in a room at 20° C for 24 hours.

2 DAYS

The film is loosely wound on a creel and is kept for 3 days and then it is tightly wound on a paper tube and is kept in a room at 20° C for 24 hours.

8 DAYS

The film is loosely wound on a creel and is kept for 8 days and then it is tightly wound on a paper tube and is kept in a room at 20° C for 24 hours.

TEST METHODS OF MEASURING PHYSICAL PROPERTIES

Tackiness

Two sheets of the film are plied at 20° C and they are pressed 3 times under a linear pressure of 0.3 Kg/cm by a roller having a diameter of 25 mm and width of 150 mm. The stress required for peeling off the two sheets of the film adhered together, is measured by an Instron tension tester under the conditions of a 180° peeling off at a speed of 300 mm/min. with a chuck space of 50 mm and a sample width of 50 mm. The tackiness is given in the units of g/50 mm. A tackiness of zero means no adhesion between two sheets of the film.

HAZE

Haze is measured by ASTM D1003-52T by using the Haze meter NHD67 manufactured by Nippon Denshoku K.K.

PERCENT TORN FILM

Two cylinders having a diameter of 80 mm are disposed on a pyramid having an upper base length of 175 mm, a lower base length of 190 mm and a height of 105 mm so that the axial lines of the cylinders are parallel to one of the upper bases while contacting each other. The sample of tacky polyolefin film having a size of 300 mm ×300 mm is fixed at a position 10 mm lower than the upper base of the pyramid for a width of 10 mm of one side of the longitudinal direction while arranging the longitudinal direction of the film (take-up direction) along the axial direction of the cylinder. Then, the other side of the longitudinal direction of the film is pulled up at a speed of 25 cm/sec. to a height of 40 mm from the bottom of the pyramid so as to wrap the two cylinders with the film. Twenty sheets of the film are tested in a room at 20° C and the percent of the number n of the torn films is shown as "percent torn film."

DEFOGGING PROPERTY

In a 1 liter beaker, 400 ml of water is charged and the beaker is covered with the sample of the film, holding the beaker to slant the film at an angle of 20° to the horizontal base, and the film is kept in a room at 20° C for 3 days. The clarity of the film is observed using the following ratings.

EXCELLENT

Water drops are well spread, uniformly wetting all the surface of the film so that the inside can be completely observed.

GOOD

Water drops having a diameter of more than 3 mm remain on the inner surface of the film so that the inside can be substantially observed.

BAD

Fine water drops remain on the inner surface of the film so that the inside cannot be observed.

EXAMPLE 1

A main component of high pressure process polyethylene having a melt index of 0.8 and a density of 0.922 (Novatec-L F120 manufactured by Mitsubishi Chemical Industries, Ltd.) was admixed with a low grade polyethylene having a number average molecular weight of about 2000(a by-product in the preparation of high pressure process polyethylene) and an alicyclic saturated hydrocarbon resin having a softening point of 90° C (petroleum resin, Arkon P-90 manufactured by Arakawarinsan Kagaku K.K.) as a tackifier and polyglycerol fatty acid ester (Rikemal 0-71-D manufactured by Riken Vitamine Oil K.K.) as a defogging agent at the ratios stated in Table 1. Each composition was extruded and inflated by an inflation extruder equipped with a die having a slit diameter of 50 mm and a screw having a ratio of L/D of 22 (MKB-6 Type manufactured by Modern Machinery Co., Ltd.) at a cylinder temperature of 160° C and a blow-up ratio of 6.5 and a take-up speed of 20 m/min. to form a tacky polyethylene film having a thickness of 16μm. The film was kept in a room at 20° C or 40° C for 8 days to age it, and the tackiness, the Haze and the percent torn film after 8 days were measured. The same test was repeated by using the films of compositions of the polyethylene with either the low grade polyethylene or the tackifier as references. The results are also shown in Table 1.

Table 1

| No. | Composition (wt. %) | | | | Aging temp. (° C) | Tackiness (g/50 mm) | | | | Haze (%) | | Percent torn film (%) (8 days) |
| | PE | GW | TAC | SA | | at forming | 1 day | 3 days | 8 days | at forming | 8 days | |
| --- | --- | --- | --- | --- | --- | --- | --- | --- | --- | --- | --- | --- |
| Exp. 1 | 95 | 2 | 3 | 0 | 20 | 5.1 | 17.1 | 20.9 | 22.3 | 5.8 | 4.3 | 0 |
| 2 | 95 | 2 | 3 | 0 | 40 | | 38.1 | 40.3 | 31.6 | | 4.0 | 0 |
| 3 | 94.6 | 2 | 3 | 0.4 | 20 | 2.4 | 3.4 | 5.4 | 7.7 | 4.3 | 1.6 | 0 |
| 4 | 94.6 | 2 | 3 | 0.4 | 40 | | 18.0 | 30.2 | 33.2 | | 2.7 | 0 |
| Ref. 5 | 98 | 2 | 0 | 0 | 20 | 0 | 1.3 | 1.3 | 1.5 | 5.3 | 4.2 | 0 |
| 6 | 98 | 2 | 0 | 0 | 40 | | 2.1 | 2.2 | 2.2 | | 2.4 | 0 |
| 7 | 96 | 4 | 0 | 0 | 20 | 1.1 | 2.0 | 1.9 | 2.0 | 4.4 | 2.4 | 0 |
| 8 | 96 | 4 | 0 | 0 | 40 | | 2.4 | 2.6 | 2.5 | | 0.6 | 0 |
| 9 | 94 | 6 | 0 | 0 | 20 | 1.9 | 2.0 | 2.1 | 2.2 | 3.7 | 0.8 | 5 |
| 10 | 94 | 6 | 0 | 0 | 40 | | 2.8 | 2.9 | 2.8 | | 0.5 | — |

Table 1-continued

| No. | Composition (wt. %) PE | GW | TAC | SA | Aging temp. (° C) | Tackiness (g/50 mm) at forming | 1 day | 3 days | 8 days | Haze (%) at forming | 8 days | Percent torn film (%) (8 days) |
|---|---|---|---|---|---|---|---|---|---|---|---|---|
| Ref. 11 | 99 | 0 | 1 | 0 | 20 | 0 | 0 | 1.8 | 0 | 5.1 | 4.8 | 0 |
| 12 | 99 | 0 | 1 | 0 | 40 |  | 3.0 | 0 | 0 |  | 3.4 | 0 |
| 13 | 97 | 0 | 3 | 0 | 20 | 1.2 | 1.6 | 0 | 0 | 5.5 | 5.1 | 0 |
| 14 | 97 | 0 | 3 | 0 | 40 |  | 0 | 0 | 0 |  | 5.7 | 0 |
| 15 | 95 | 0 | 5 | 0 | 20 | 0.8 | 1.2 | 0 | 0 | 6.9 | 6.1 | 0 |
| 16 | 95 | 0 | 5 | 0 | 40 |  | 0 | 0 | 0 |  | 7.0 | 5 |

PE: polyethylene resin
GW: low grade polyethylene
TAC: tackifier
SA: defogging agent These symbols are used in all examples. As a result, when the low grade polyethylene and the petroleum resin were incorporated in the polyethylene, remarkable synergistic effects were found. When the defogging agent was incorporated, the tackinesses of the film at the time of forming of the film were relatively low; however, the clarity of the films at forming and after 8 days aging were remarkably improved. The low grade polyethylene was effective for the improvement of clarity.

EXAMPLE 2

In accordance with the process of Example 1 except using various terpenes instead of the tackifier of Example 1, films were formed and were kept for aging. The tackiness, the Haze of the film and percent torn film were measured. The results are shown in Table 2.

terpene resin (b) was inferior to that of the hydrogenated terpene resin (a) from the viewpoint of clarity.

EXAMPLE 3

In accordance with the process of Example 1 except using rosin instead of the tackifier of Example 1, films were formed and were kept for aging and the tackiness and the Haze of the film were measured. The results are shown in Table 3.

Table 3

| No. | Composition (wt. %) PE | GW | TAC | Aging temp. (° C) | Tackiness (g/50 mm) at forming | 1 day | 3 days | 8 days | Haze (%) at forming | 8 days |
|---|---|---|---|---|---|---|---|---|---|---|
| Exp. 14 | 95 | 2 | 3 | 20 | 5.8 | 4.2 | 4.3 | 3.6 | 4.6 | 4.0 |
| 15 | 95 | 2 | 3 | 40 |  | 21.4 | 11.7 | 10.4 |  | 10.6 |
| Ref. 16 | 97 | 0 | 3 | 20 | 1.6 | 0 | 0 | 0 | 5.4 | 12.5 |
| 17 | 97 | 0 | 3 | 40 |  | 0 | 0 | 0 |  | 6.9 |

When the rosin was used, the synergistic effect on tackiness was found; however, the clarity was relatively low by aging at high temperature.

EXAMPLE 4

Each polyethylene composition shown in Table 4 was extruded to form a tacky film in accordance with the process of Example 1 and the film was kept in a Table 2

| No. | Composition (wt. %) PE | GW | TAC | Aging temp. (° C) | Tackiness (g/50mm) at forming | 1 day | 3 days | 8 days | Haze (%) at forming | 8 days | Percent torn film (%) (8 days) |
|---|---|---|---|---|---|---|---|---|---|---|---|
| (a) Hydrogenated terpene resin having a softening point of 100° C (terpene-phenol copolymer) ||||||||||||
| Exp. 1 | 95 | 2 | 3 | 20 | 4.3 | 23.7 | 27.9 | 25.9 | 5.6 | 3.5 | 0 |
| 2 | 95 | 2 | 3 | 40 |  | 28.0 | 30.4 | 24.6 |  | 3.7 | 0 |
| 3 | 93 | 2 | 5 | 20 | 9.2 | 11.6 | 10.0 | 11.3 | 6.0 | 5.0 | 5 |
| Ref. 4 | 97 | 0 | 3 | 20 | 0.7 | 0.8 | 0 | 0 | 5.2 | 6.5 | 0 |
| 5 | 97 | 0 | 3 | 40 |  | 0 | 0 | 0 |  | 6.5 | 0 |
| (b) Non-hydrogenated terpene resin having a softening point of 100° C(terpene-phenol copolymer) ||||||||||||
| Exp. 6 | 95 | 2 | 3 | 20 | 3.3 | 5.0 | 5.7 | 4.8 | 4.6 | 5.6 | — |
| 7 | 95 | 2 | 3 | 40 |  | 3.9 | 4.5 | 3.0 |  | 22.7 | — |
| 8 | 93 | 2 | 5 | 20 | 4.7 | 7.0 | 7.2 | 5.8 | 5.1 | 37.3 | — |
| Ref. 9 | 97 | 0 | 3 | 20 | 0 | 0 | 0 | 0 | 4.6 | 4.6 | — |
| 10 | 97 | 0 | 3 | 40 |  | 0 | 0 | 0 |  | 6.5 | — |
| (c) Terpene resin having a softening point of 90° C (turpentine polymer) ||||||||||||
| Exp. 11 | 95 | 2 | 3 | 20 | 5.4 | 13.6 | 18.7 | 23.0 | 5.1 | 2.3 | 0 |
| Ref. 12 | 97 | 0 | 3 | 20 | 2.7 | 3.7 | 2.2 | 0 | 4.4 | 4.2 | 0 |
| (d) Terpene resin having a softening point of 115° C(turpentine polymer) ||||||||||||
| Exp. 13 | 95 | 2 | 3 | 20 | 6.1 | 16.9 | 26.9 | 26.9 | 4.1 | 2.8 | 0 |
| Ref. 14 | 97 | 0 | 3 | 20 | 0.8 | 2.4 | 0 | 0 | 5.5 | 4.8 | 0 |

As a result, it was found that the combination of the terpene resins and the low grade polyethylene were also effective for imparting a synergistic effect, as was the combination of the petroleum resin and the low grade polyethylene. The incorporation of the unhydrogenated room at 20° C for 8 days for aging. The tackiness, the percent torn film and the defogging property were measured. The results are shown in Table 4.

TABLE 4

| No. | Composition (wt. %) PE | GW | TAC | SA | Tackiness at forming | 8 days | Percent torn film (%) | Defogging property |
|---|---|---|---|---|---|---|---|---|
| 1 | 96.4 | 2 | 1.5 | 0.1 | 3.0 | — | 0 | excellent |
| 2 | 94.6 | 2 | 3 | 0.4 | — | — | 0 | good |
| 3 | 94.6 | 2 | 3 | 0.4 | 2.4 | 7.7 | 0 | good |
| 4 | 95 | 2 | 3 | 0 | 5.1 | 22.3 | 0 | bad |
| 5 | 92.9 | 4 | 3 | 0.1 | 3.4 | — | 0 | good |
| 6 | 92.6 | 0 | 7 | 0.4 | — | — | 0 | good |

Note: The defogging agent used in No. 1 and 2 of Example 4 was glycerol fatty acid ester (Rikemal OL-100 manufactured by Riken Vitamine Oil K.K.). The defogging agent used in No. 3 to 6 was polyglycerol fatty acid ester (Rikemal)-71-D manufactured by Riken Vitamine Oil K.K.).

REFERENCE EXAMPLE 1

95 wt.% of high pressure process polyethylene (M I 0.8; density 0.922) was admixed with 2 wt.% of low grade polyethylene having a number average molecular weight of about 2000 and 3 wt.% of the alicyclic saturated hydrocarbon resin Arkon P-90 (softening point of 90° C), Arkon P-70 (softening point of 70° C) or Arkon P-115 (softening point of 115° C). Each composition was extruded at a cylinder temperature of 160° C in accordance with the process of Example 1 except for control of the extrusion rate and the blow-up ratio to form a film having a thickness of 20μm. The percent torn film at the time of forming of the film was measured. The results are shown in Table 5.

TABLE 5

| No. | Blow-up ratio | Tackifier | Percent torn film (%) |
|---|---|---|---|
| 1 | 3 | Arkon P-90 | 65 |
| 2 | 4 | " | 30 |
| 3 | 5 | " | 5 |
| 4 | 6 | " | 0 |
| 5 | 7 | " | 0 |
| 6 | 8 | " | infabricatable |
| 7 | 6 | Arkon P-70 | 0 |
| 8 | 6 | Arkon P-115 | 0 |

EXAMPLE 5

A main component of high pressure process polyethylene having a melt index of 0.8 and a density of 0.922 (Novatec-L F120 manufacuted by Mitsubishi Chemical Industries, Limited) or ethylene-vinylacetate copolymer having a vinyl acetate content of 10% was admixed with a low grade polyethylene having a number average molecular weight of about 2000 and an alicyclic saturated hydrocarbon resin having a softening point of 90° C (Arkon P-90 manufactured by Arakawarinsan Kagaku K.K.) as a tackifier and glycerol oleate as a defogging agent at the ratios stated in Table 6. Each composition was extruded and inflated by an inflation extruder equipped with a die having a diameter of slit of 50 mm and a ratio of L/D of 22 (MKB-6 Type manufactured by Modern Machinery Co., Ltd.) at a cylinder temperature of 160° C and a blow-up ratio of 6 and a take-up speed of 10 m/min. to form a tacky polyethylene film having a thickness of 20μm. The film was loosely wound up on a creel and was kept in a room at 20° C for a period for aging it, and the tackiness, the Haze and the percent torn film after 8 days were measured. The results are shown in Table 6. The results of the defogging property after 8 days were excellent in all samples.

Table 6

| No. | Composition (wt. %) PE | GW | TAC | SA | Tackiness (g/50 mm) at forming | 1 day | 3 days | 8 days | Haze (%) at forming | 8 days | Percent torn film (%) (8 days) |
|---|---|---|---|---|---|---|---|---|---|---|---|
| (a) High pressure process polyethylene | | | | | | | | | | | |
| 1 | 96.3 | 2 | 1.5 | 0.2 | 2.2 | 3.0 | — | — | 3.6 | — | 0 |
| 2 | 94.8 | 2 | 3 | 0.2 | 3.1 | 6.2 | 8.5 | 10 | 4.2 | 2.3 | 0 |
| 3 | 92.8 | 2 | 5 | 0.2 | 15 | 30 | 40 | 35 | 5.7 | 3.0 | 0 |
| 4 | 94.3 | 4 | 1.5 | 0.2 | 2.0 | 2.6 | — | — | 2.5 | — | 0 |
| 5 | 92.8 | 4 | 3 | 0.2 | 2.5 | 40 | — | — | 3.6 | — | 0 |
| 6 | 90.8 | 4 | 5 | 0.2 | 10 | 20 | 35 | 50 | 3.8 | — | 5 |
| 7 | 88.8 | 6 | 5 | 0.2 | 6.4 | 8.4 | — | — | 2.7 | — | 10 |
| (b) Ethylene-vinylacetate copolymer | | | | | | | | | | | |
| 8 | 94.8 | 2 | 3 | 0.2 | 2.7 | 5.4 | 7.7 | 9.2 | 6.7 | 3.5 | 0 |
| 9 | 88.8 | 6 | 5 | 0.2 | 5.4 | 7.7 | — | — | 5.2 | — | 5 |

As a result, when glycerol oleate was added to the composition, the defogging property at the time of forming of the film was improved in comparison with the results for non-addition. (See No. 1 of Example 1)

EXAMPLE 6

In accordance with the process of Example 5 except using a alicyclic saturated hydrocarbon resin having a softening point of 70° C (Arkon P-70) as a tackifier, the films were formed and aged and the tests were carried out. The compositions and the results are shown in Table 7.

Table 7

| No. | Composition (wt. %) PE | GW | TAC | SA | Tackiness (g/50 mm) at forming | 1 day | 3 days | 8 days | Haze (%) at forming | 8 days | Percent torn film (%) (8 days) |
|---|---|---|---|---|---|---|---|---|---|---|---|
| 1 | 94.8 | 2 | 3 | 0.2 | 2.3 | 4.6 | 7.2 | 9.3 | 3.6 | 1.9 | 0 |
| 2 | 92.8 | 2 | 5 | 0.2 | 21 | 44 | — | — | 4.4 | — | 0 |
| 3 | 92.8 | 4 | 3 | 0.2 | 2.2 | 3.2 | — | — | — | — | 0 |
| 4 | 90.8 | 4 | 5 | 0.2 | 7.3 | 16.5 | 31 | 45 | 2.9 | 1.3 | 5 |
| 5 | 90.8 | 6 | 3 | 0.2 | 2.5 | 3.9 | — | — | 2.4 | — | 5 |
| 6 | 88.8 | 6 | 5 | 0.2 | 7.6 | 9.5 | — | — | 2.7 | — | 10 |

EXAMPLE 7

In accordance with the process of Example 6 except using a alicyclic saturated hydrocarbon resin having a softening point of 115° C (Arkon P-115) as a tackifier, the films were formed and aged and the tests were carried out. The compositions and the results are shown in Table 8.

Table 8

| No. | Composition (wt. %) | | | | Tackiness (g/50 mm) | | | | Haze (%) | | Percent torn film (%) (8 days) |
| --- | --- | --- | --- | --- | --- | --- | --- | --- | --- | --- | --- |
| | PE | GW | TAC | SA | at forming | 1 day | 3 days | 8 days | at forming | 8 days | |
| 1 | 94.8 | 2 | 3 | 0.2 | 2.5 | 4.6 | — | — | — | — | 0 |
| 2 | 92.8 | 2 | 5 | 0.2 | 15 | 44 | — | — | — | — | 0 |
| 3 | 88.8 | 6 | 5 | 0.2 | 4.6 | 4.8 | 9.3 | 11 | 3.3 | 1.5 | 10 |

In Examples 6 and 7, the type of the petroleum resin was changed. The synergistic effects of the petroleum resin and the low grade polyethylene were found and the clarity was improved by these petroleum resins.

EXAMPLE 8

95 wt.% of high pressure process polyethylene (M I 0.8; density 0.922) was admixed with 2 wt.% of a low grade polyethylene having a number average molecular weight of about 2000 and 3 wt.% of a petroleum resin having a softening point of 90° C (Arkon P-90) or a terpene resin (turpentine polymer having a softening point of 90° C). Each film of the composition prepared in accordance with the process of Example 1, was continuously passed through a room kept at the specified temperature for aging for the specified period; and the tackiness, the Haze and the percent torn were measured. The results are shown in Table 9.

Table 9

| No. | Tackifier | Aging temp. (° C) | Tackiness (g/50 mm) | | | Haze | | Percent torn film (%) |
| --- | --- | --- | --- | --- | --- | --- | --- | --- |
| | | | at forming | 30 sec. | 60 sec. | at forming | 60 sec. | |
| 1 | petroleum resin | 50 | 5.1 | 5.1 | 5.2 | 5.8 | 5.8 | 0 |
| 2 | " | 70 | | 6.9 | 10.0 | | 4.1 | 0 |
| 3 | " | 90 | | 9.4 | 12.8 | | 3.8 | 0 |
| 4 | " | 110 | | — | — | | 2.7 | 0 |
| 5 | terpene resin | 50 | 5.4 | 5.4 | 5.4 | 5.1 | 5.1 | 0 |
| 6 | " | | | 6.3 | 9.0 | | 4.9 | 0 |

What is claimed is:

1. A process for preparing a tacky polyolefin film which comprises forming a film by using a composition comprising 98.5 to 88 wt.% of a polyolefin resin, 0.5 to 6 wt.% of a low grade polyolefin and 1 to 6 wt.% of a tackifier and then aging the resulting film.

2. The process of claim 1, wherein the aging is carried out while controlling the residence period in an a temperature of at 20° to 150° C.

3. The process of claim 1, wherein the aging is carried out by keeping the film loosely wound on a creel in an atmosphere at a temperature of 35° to 60° C for longer than 15 minutes.

4. The process of claim 1, wherein the aging is carried out by passing the film through an atmosphere at a temperature of 60° to 150° C for from 5 to 120 seconds.

5. The process of claim 1, wherein the film is formed by an inflating technique using a blow-up ratio of higher than 4.

6. The process of claim 1, wherein the composition comprises 98.5 to 88 wt.% of polyolefin resin, 2 to 4 wt.% of a low grade polyolefin and 3 to 5 wt.% of a tackifier.

7. The process of claim 1, wherein the composition comprises 98.45 to 86 wt.% of polyolefin resin, 0.5 to 6 wt.% of a low grade polyolefin, 1 to 6 wt.% of a tackifier and 0.05 to 2 wt.% of a defogging agent.

8. The process of claim 1, wherein the polyolefin is polyethylene, polypropylene, ethylene-propylene copolymer, ethylenevinyl acetate copolymer or polybutene-1.

9. The process of claim 1, wherein the polyolefin is a low density polyethylene having a density of 0.91 to 0.93 or ethylenevinylacetate copolymer having a vinylacetate content of less than 20 wt.% and a density of 0.91 to 0.94.

10. The process of claim 1, wherein the low grade polyolefin is polyethylene wax or ethylene-vinyl acetate copolymer wax having a number average molecular weight of 500 to 5,000.

11. The process of claim 1, wherein the tackifier is a terpene resin, a coumarone resin, a coumarone-indene resin, a xylene resin, a rosin or a petroleum resin, a mixture thereof.

12. The process of claim 1, wherein the tackifier is a petroleum resin or terpene resin having a softening point of 60° to 120° C.

13. The process of claim 7, wherein the defogging agent is a polyoxyethylene alkyl ether, a polyoxyethylene fatty acid ester, a sorbitane fatty acid ester, a glycerol fatty acid ester, or a sodium dialkylsulfosuccinate.

14. The process of claim 7, wherein the defogging agent is a glycerol mono- or di-fatty acid ester or polyglycerol fatty acid ester.

15. The process of claim 4, wherein said temperature is 80° to 120° C.

16. The process of claim 5, wherein said blow-up ratio is 5 to 7.

17. The process of claim 10, wherein said molecular weight is 1000 to 3000.

* * * * *